United States Patent
Swan

(10) Patent No.: US 7,460,113 B2
(45) Date of Patent: Dec. 2, 2008

(54) DIGITAL PIXEL CLOCK GENERATION CIRCUIT AND METHOD EMPLOYING INDEPENDENT CLOCK

(75) Inventor: Philip Swan, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 515 days.

(21) Appl. No.: 10/908,429

(22) Filed: May 11, 2005

(65) Prior Publication Data

US 2006/0256102 A1 Nov. 16, 2006

(51) Int. Cl.
G06F 3/038 (2006.01)
(52) U.S. Cl. ...................... 345/204; 345/213
(58) Field of Classification Search ................ 345/204, 345/213–215
See application file for complete search history.

(56) References Cited

U.S. PATENT DOCUMENTS 6,320,574 B1 * 11/2001 Eglit ........................ 345/213

* cited by examiner

Primary Examiner—Ricardo L Osorio
(74) Attorney, Agent, or Firm—Vedder Price P.C.

(57) ABSTRACT

A digital pixel clock generation circuit receives image data and corresponding image presentation time information from at least one external image source. The digital pixel clock generation circuit includes an image presentation timing error determination circuit that produces desired pixel clock frequency control information, such as pixel output clock adjustment control information, based on a difference between an expected presentation time and an actual presentation image time information. A programmable digital waveform generation circuit is programmed based on the produced desired pixel clock frequency and has an input that is responsive to an independent clock source, that is independent from the clock source of the external image source. The programmable digital waveform generation circuit provides a digital representation of an independently generated desired pixel clock which is then output to a digital to analog converter (DAC).

13 Claims, 4 Drawing Sheets

DIGITAL PIXEL CLOCK GENERATION CIRCUIT AND METHOD EMPLOYING INDEPENDENT CLOCK

FIELD OF THE INVENTION

The invention relates generally to digital clock generation circuits and methods and more particularly to digital pixel clock generation circuits for displays that employ independent pixel clock sources.

BACKGROUND OF THE INVENTION

Digital display devices are becoming increasingly popular, such as LCD display units, plasma display units, digital light projection units and any other digital display devices. Such display devices that employ format converting attempt to convert the format that arrive from image sources—such as personal computers, game boxes, DVD players, MPEG decoders, or other sources—to the display image format. Signals that arrive from personal computers for example may be communicated with timing modes (such as VESA type timing modes) that may be transmitted with relatively loose timing accuracy compared to those used for video applications. The timing signals, such as horizontal synchronization signals and vertical synchronization signals or other suitable display timing signals may vary as much as plus or minus 0.25% out of specification. Such incoming timing signals can be sources of jitter and may be not be desirable for high quality video clocking purposes.

Several known format converting circuits are known which are typically co-located with the digital display unit and include a digital pixel clock generation circuit that may be, for example, within the housing containing the digital display panel. One example of a known digital pixel clock generation circuit for a display may convert incoming display signals, such as horizontal synchronization signals directly into a clock for driving the digital display. The clock is often referred to as a pixel output clock. Such clock generation circuits may use an external phase locked loop circuit designed to handle a low reference clock signal. However, the external phase locked loop (PLL) circuit is typically in the form of a chip or other suitable integrated circuit and can be expensive. The incoming horizontal synchronization's poor jitter characteristics may also be reflected in the local output pixel clock as its jitter characteristics may be partially passed along by the PLL circuit. In addition, it is not always possible to convert the external incoming pixel clock from the image source into a suitable frequency when performing format conversion.

Other solutions may have an output pixel clock that does not lock to an incoming pixel clock from an image source, but instead may run use an independently derived and unlocked clock. These solutions will drop or repeat pictures to prevent an internal picture buffer from eventually overflowing of underflowing. Dropping or repeating pictures can be unacceptable when the displays are used for video or animated games.

As a result, other prior art digital pixel clock generation circuits have been developed. FIG. 1 illustrates a functional block diagram of one example of a digital display control circuit that employs a digital pixel clock generation circuit 10. The circuit includes, for example, a multiplexer 11 which outputs one of a selected input source and corresponding input pixel clock or timing information for use by the display control circuit. The digital display control circuit performs format conversion as needed by the digital display. The digital pixel clock generation circuit 10, as known in the art, employs an independent clock source other than the input pixel clock received from the image source. In this example, the independent clock source 12 is a voltage controlled crystal oscillator. Known digital pixel clock generation circuits 10 may receive, for example, image data and corresponding presentation time information 14 from a suitable image source such as a cable set top box, a DVD player, personal computer, game box or other suitable image source, along with an input pixel clock 16 which may be provided, for example, by the image source.

The digital pixel clock generation circuit 10 is typically part of other digital display circuitry that is co-located with the digital display to provide scaling and other display specific encoding. For example, as shown, an image scaler 18 that is coupled to a frame buffer 20 may be employed as well as a display encoder 22 which is provides timing information from a CRTC 32 and image data 24 to the digital display 26. "CRTC" stands for "Cathode Ray Tube Controller"; however, it is a term now used to represent a block that generates timing signals useful for driving display devices in general—including newer devices that do not use CRT technology. The digital pixel clock generation circuit 10 includes a control circuit 28 and a PLL 30. The control circuit 28 receives actual image presentation time data 36, from the CRTC 32 and compares it with incoming presentation time information 14 from the image source to determine any difference between them. The control circuit 28 then provides a suitable timing adjustment control signal 40 to, in one embodiment, the PLL 30 to speed up or reduce the pixel output clock 42 from the PLL. The independent clock source 12 feeds the PLL 30 with an independent clock signal 44, which the PLL then converts to a pixel output clock, 42, based on a ratio that is adjusted by input 40 to the PLL. PLLs can convert one clock to another. Typically they have a wide conversion range but limited stepping granularity. The granularity is often overly coarse for the application of converting one kind of video signal into another. This will result in a pixel clock that is never quite the required frequency, but instead hopping back and forth between two or more nearby frequencies. The hopping back and forth introduces jitter in the output clock which can reduce the video quality of the digital display device 26. Some PLL designs endeavor to overcome the granularity limitations of a PLL by rapidly changing one of the PLL's control parameters but such techniques also introduce undesirable jitter into the output clock.

Another technique used is to control the frequency of the reference clock 12 directly. This can be done if the reference clock is a Voltage Controlled Crystal Oscillator, for example. In this case, the PLL can stay fixed at one conversion ratio and thus not be a source of jitter. The VCXO is adjusted by converting control signal 40 into a voltage which will be used to speed up or slow down the VCXO. This approach is limited because the VCXO, while it has good stepping granularity, has poor range. There are a wide variety of format conversion problems which can not be handled with the VCXO's limited range. Also, the VCXO is a significantly more expensive clock reference than a standard crystal oscillator.

A combination of both solutions may appear to overcome the limited stepping granularity of one and the limited range of the other; however, you can't get the range without stepping and introducing a VCXO will not eliminate the jitter introduced by the act of stepping a PLL.

Accordingly, a need exists for a circuit and method that overcomes one or more of the above problems.

BRIEF DESCRIPTION OF THE DRAWINGS

The invention will be more readily understood in view of the following description when accompanied by the below figures and wherein like reference numerals represent like elements.

DETAILED DESCRIPTION OF THE PREFERRED EMBODIMENT

Briefly, a digital pixel clock generation circuit receives image data and corresponding image presentation time information from at least one external image source. The digital pixel clock generation circuit includes an image presentation timing error determination circuit that produces desired pixel clock frequency control information, such as pixel output clock adjustment control information, based on a difference between an expected presentation time and an actual presentation image time information. A programmable digital waveform generation circuit is programmed based on the produced desired pixel clock frequency and has an input that is responsive to an independent clock source, that is independent from the clock source of the external image source. The programmable digital waveform generation circuit provides a digital representation of an independently generated desired pixel clock which is then output to a digital to analog converter (DAC). The digital to analog converter provides an analog representation of the digital representation of the independently generated desired pixel clock for the digital display. Among other advantages, an independent clock source provides the programmable digital waveform generation circuit with a reference clock signal and the programmable digital waveform generation circuit provides a independently generated desired pixel clock for the digital display that has both a fine stepping granularity and a large frequency range thereby providing a suitable display pixel clock for format conversion, or other suitable application.

In another embodiment, the digital pixel clock generation circuit includes the independent clock source and also includes a phase locked loop circuit coupled to an output of the digital to analog converter which provides an independently generated desired pixel clock with additional phase correction. In another embodiment, an analog filter is provided between the digital to analog converter and the phase locked loop circuit to provide a more accurate independent output pixel clock for the digital display. The filtered signal is used as a reference for the internal phase locked loop.

Figure 1:
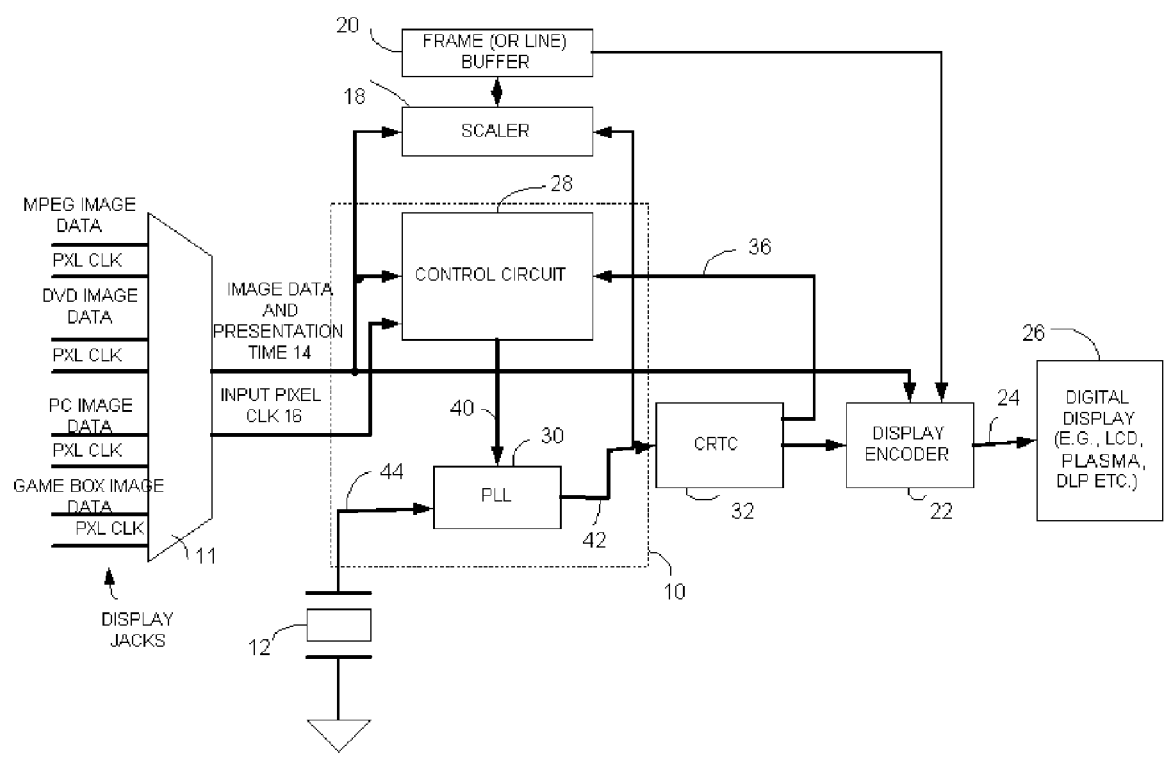
FIG. 1 is a block diagram illustrating one example of a prior art digital pixel clock generation circuit.
Figure 2:
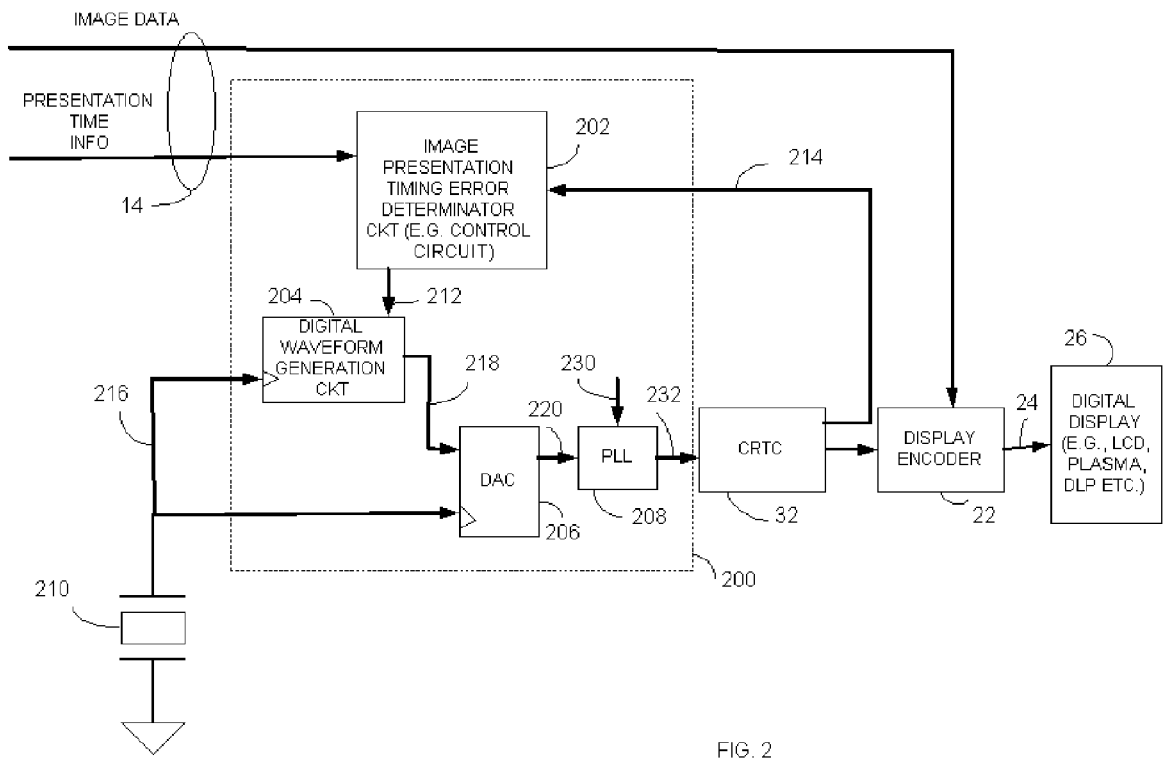
FIG. 2 is a block diagram illustrating one example of a digital pixel clock generation circuit in accordance with one embodiment of the invention.

FIG. 2 is a functional block diagram illustrating one example of a digital pixel clock generation circuit 200 that includes an image presentation timing error determination circuit 202, a programmable digital waveform generation circuit 204 and a digital to analog converter circuit 206. If desired, the circuit 200 may include a phase locked loop circuit 208 and an independent clock source 210, such as crystal oscillator. This clock source could also be a phase locked loop circuit, voltage controlled crystal oscillator, or any other suitable independent clock source that is independent from a clock source of an external image source. As shown, the digital pixel clock generation circuit 200 is operatively coupled to other display circuitry as known in the art such as a CRTC 32 and display encoder 22. In this example, the digital pixel clock generation circuit 200 is co-located or located within the housing that contains the display 26. As such, although not shown, the display jacks in the monitor may be operatively coupled to a multiplexing structure (see FIG. 1) so that one or more sets of image data and presentation time information along with corresponding input pixel clock information may be received from one or more external image sources.

The image presentation timing error determination circuit 202 produces desired pixel clock frequency control information 212 indicating, for example, a desired pixel clock frequency based on a difference between actual image presentation time information 214 as provided, for example, from the CRTC 32, as known in the art, and received image presentation time information 14 as received from the external image source or as desired from information in the source signal (e.g. target presentation time information). The received image data may be scaled or otherwise processed and sent to the display encoder 22 as known in the art.

The programmable digital waveform generation circuit 204 receives the desired pixel clock frequency control information 212 and also receives the independent clock source signal 216 as its clock source from the independent clock source 210 and produces a digital representation of an independently generated desired pixel clock designated as 218. The programmable digital waveform generation circuit 204 may be any suitable digital waveform generator as known in the art.

The digital to analog converter 206 has an input that receives the digital representation of the independently generated desired pixel clock 218 and has an output that provides an analog representation 220 of the digital representation of the independently generated desired pixel clock 218 for use by the digital display 26. As shown, the independent clock source 210 may serve as a clock input for both the programmable digital waveform generation circuit 204 and the digital to analog converter 206. The digital waveform generation circuit 204 does not strictly have to be on the same clock as the digital to analog converter 206, this is just a convention generally employed in synchronous digital design.

The digital pixel clock generation circuit 200 may be implemented using any suitable combination of hardware, software and firmware as known in the art. For example, the image presentation timing error determination circuit, programmable digital waveform generation circuit and digital to analog converter may be fabricated using discreet logic as known in the art. Alternatively, one or more suitably programmed processing devices such as microprocessors, DSPs, state machines, or any other suitable structure may also be used.

In this example, the digital pixel clock generation circuit 200 includes the phase locked loop circuit 208 having a reference clock input that is operatively coupled to the output of the DAC 206. The PLL control input 230 can be set to convert the synthesized waveform 220 to a clock 232 suitable for driving the display 26. This control input will be set once and not altered dynamically as changing it dynamically would introduce jitter into the PLL's output and thus reduce the quality of the signal produced by the display encoder 22. The PLL 208 has an output that provides an independently generated desired pixel clock with additional phase correction 232 for the CRTC 32. The independently generated desired pixel clock with additional phase correction 232 serves as the pixel output clock for the digital display 26.

Figure 3:
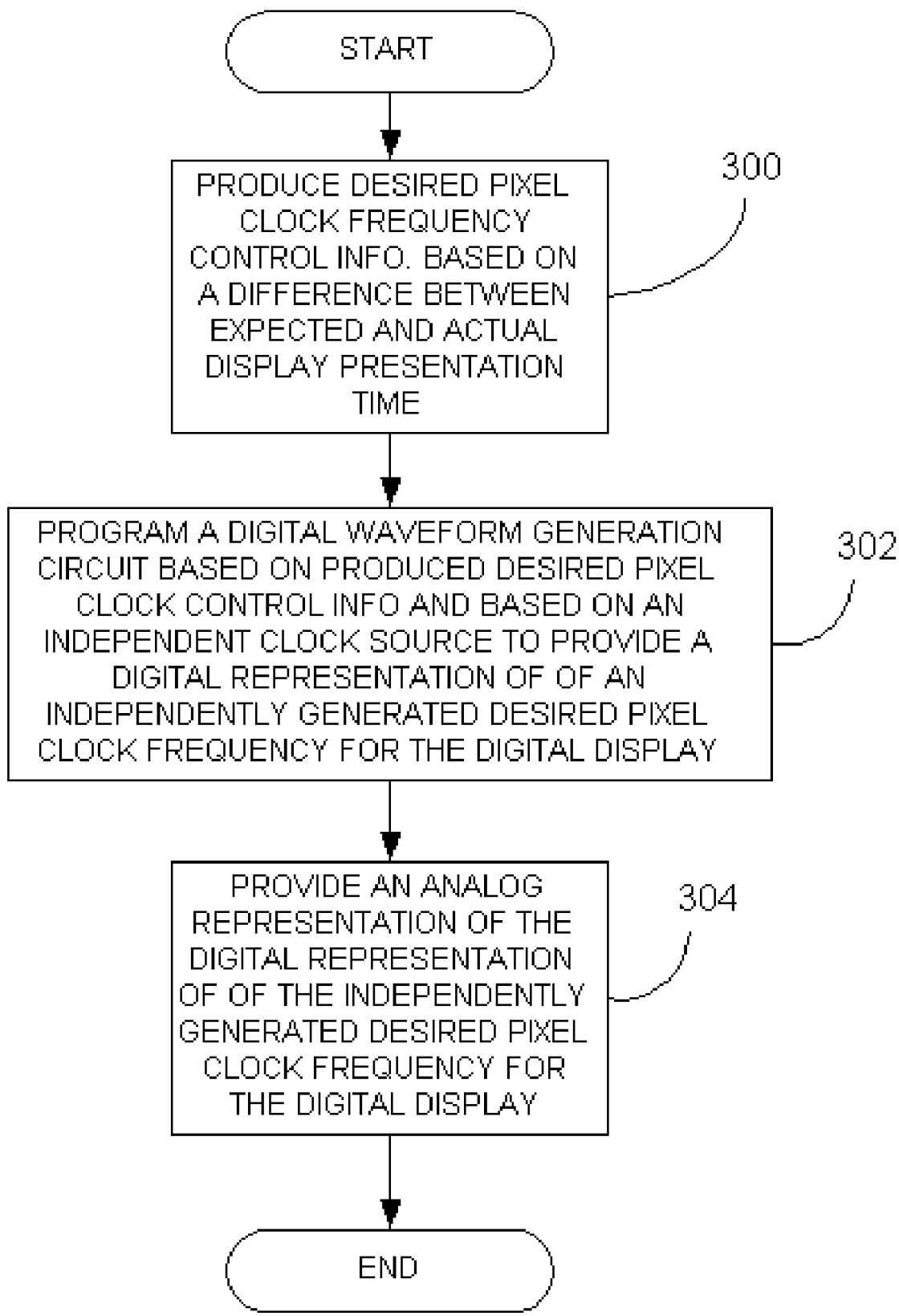
FIG. 3 is a flowchart illustrating one example of a method for generating a digital pixel clock in accordance with one embodiment of the invention.

FIG. 3 illustrates one example of a method for generating a digital pixel clock in response to received image data and corresponding image presentation time information based on a first clock from at least one external image source. The method may be carried out, for example, by the digital pixel clock generation circuit 200 of FIG. 2 or any other suitable logic or device. The method includes as shown in block 300, producing desired pixel clock frequency control information, such as by the image presentation timing error determination circuit, based on a difference between expected presentation time information which is based on the received image presentation time information from the image source and actual presentation time information received from, for example, the CRTC. As shown in block 302, the method includes programming a digital waveform generation circuit, such as through any suitable logic including the image presentation timing error determination circuit, based on the produced desired pixel clock frequency control information to provide a digital representation of an independently generated desired pixel clock as based on an independent clock source. As shown in block 304, the method includes providing an analog representation, such as by the DAC, of the digital representation of the independently generated desired pixel clock for the digital display. As such, the circuit and method above utilizes a programmable digital waveform generation circuit in combination with a digital to analog converter and timing detection circuitry to provide a suitable digital pixel clock for a digital display.

Figure 4:
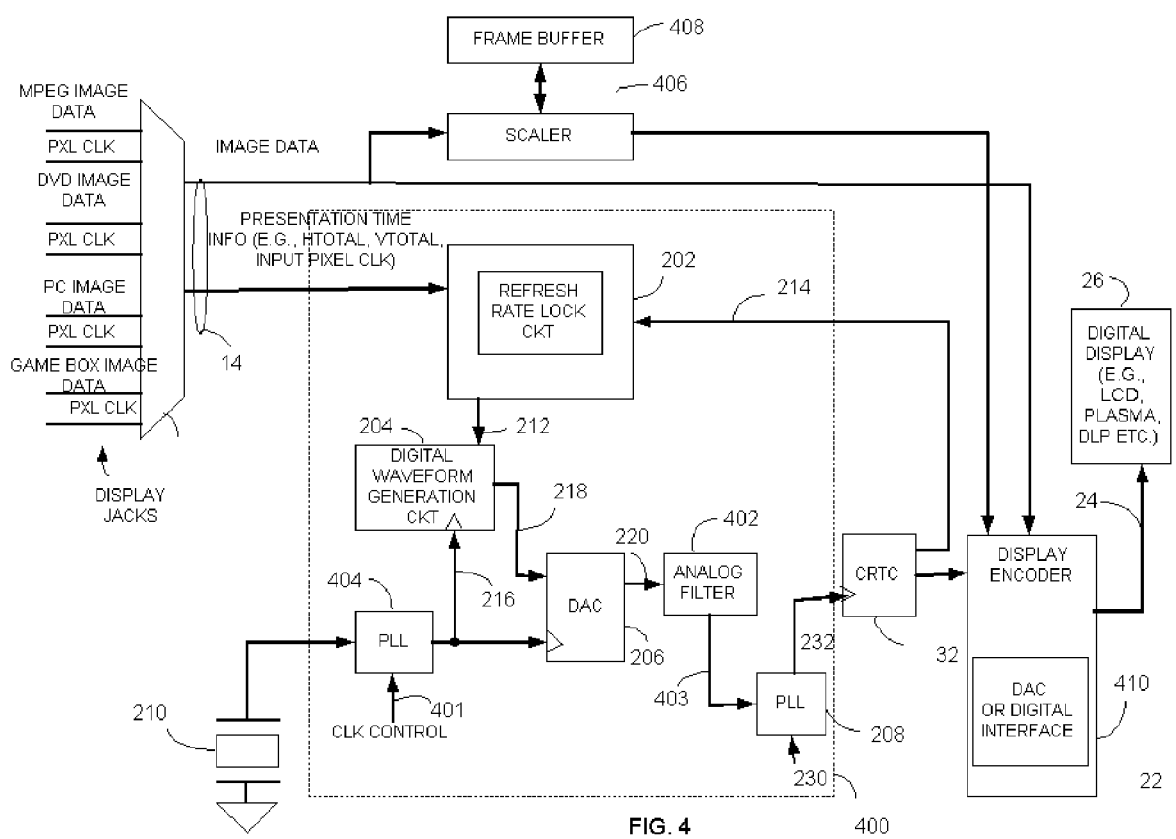
FIG. 4 is a block diagram illustrating one example of a digital pixel clock generation circuit in accordance with one embodiment of the invention.

FIG. 4 illustrates a digital pixel clock generation circuit 400 that includes, in addition to the elements shown in FIG. 2, an analog filter 402, an additional phase lock loop 404, an image scaler 406 and frame buffer memory 408. As known in the art, the frame buffer memory 408 may also be, for example, a line buffer or any other suitable memory to store image data. The scaler 406 may be any conventional scaler such as scaler 18 (FIG. 1). As shown, the analog filter is interposed between the output of the DAC 206 and the input of the PLL 208 to provide a filtered analog input signal for the PLL 208. The analog filter may be any suitable lo-pass, band-pass or high-pass filter or any suitable combination thereof as desired to produce a signal more suitable for the PLL 208. The filter may be designed, for example, to pass frequencies that are desired in the synthesized waveform and block those that are not. For example, frequencies from the PLL 404 or clock source 210 could be blocked.

The digital display timing control logic or CRTC 32 receives the independently generated desired pixel clock with additional phase correction 232 and produces actual presentation time information 214 for the image presentation timing error determination circuit 202 which may serve as a refresh rate locking circuit. Hence the image presentation timing error determination circuit 202 may determine an adjustable frequency value for the digital waveform generation circuit otherwise referred to herein as the produced desired pixel clock frequency control information 212 for the digital waveform generation circuit 204.

HTotal is the number of clocks in a line—including active, sync, and blanking times. VTotal is the number of lines in a frame—including active, sync, and blanking times. The pixel clock period times HTotal times VTotal is the frame period. Knowledge of the timing HTotal and VTotal values is needed to interpret the HSyncs and VSyncs and subsequently convert HSyncs and VSyncs into presentation time information. Presentation time information can be in units of milliseconds, for example. The information may include the time to the start of the next picture, and the average time between the start of two pictures.

Also if desired an additional DAC 410 may be used to produce image information from scaled image data produced by the scaler, for output on the digital display device, as known in the art.

The disclosed digital pixel clock generation circuits keep the clock conversion ratio input 230 to the PLL 208 and the clock 210 constant. Thus it does not rely on the adjustment mechanisms of the prior art to keep the display locked to the source. Instead it varies the input signal (filtered signal from analog filter 402) to the PLL 230 based on a waveform generated output signal. The digital waveform generation circuit can synthesize a wide range of frequencies which overcomes limitations of systems that rely on adjusting a VCXO. It can also generate any frequency in the range with extremely high stepping granularity which enables it to overcome fundamental stepping granularity limitations of a PLL. For example the digital waveform generation circuit can easily be designed to synthesize a frequency of X, and then change to slightly different frequency of X*1,000,000,001/1,000,000,000. Other differences and advantages will be recognized by those of ordinary skill in the art. In addition, the analog filter filters the analog representation of the digital representation of the independently generated desired pixel clock for the digital display. The inputs 401 to PLL 404 is used to change the clock from 210 to a more convenient clock for rendering the waveform.

Among other advantages, an independent digital pixel clock is generated using a programmable waveform generator and digital to analog converter, such as a 10-bit digital to analog converter or any other suitable size DAC to provide a wider range and finer resolution independent pixel clock for digital display devices to improve video picture quality.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A digital pixel clock generation circuit operative to receive timing information associated with image data from at least one external image source from which image presentation time information can be derived comprising:

an image presentation timing error determination circuit operative to produce desired pixel clock frequency control information based on a difference between expected presentation time, which is based on at least the received image presentation time information from the external image source, and presentation time information provided by a display controller that is operatively coupled to the digital display clock generation circuit;

a programmable digital waveform generation circuit that is programmed based on the produced desired pixel clock frequency control information, having an input responsive to an independent clock source and an output operative to provide a digital representation of an independently generated desired pixel clock; and a digital to analog converter (DAC) having an input, operatively coupled to receive the digital representation of the independently generated desired pixel clock, and an output operative to provide an analog representation of the digital representation of the independently generated desired pixel clock for the digital display based on the independent clock source.

2. The digital pixel clock generation circuit of claim 1 further including a phase locked loop circuit (PLL) having an reference clock input operatively coupled to the output of the DAC, and an output that provides an independently generated desired pixel clock.

3. The digital pixel clock generation circuit of claim 2 farther including an analog filter operatively interposed between the DAC and the PLL to provide a filtered analog input signal for the PLL.

4. The digital pixel clock generation circuit of claim 1 including display timing control logic operatively responsive to the analog representation of the digital representation of the independently generated desired pixel clock and operative to produce the actual presentation time information.

5. A digital pixel clock generation circuit operative to receive image data and corresponding image presentation time information based on a first clock from at least one external image source comprising:
   an image presentation timing error determination circuit operative to produce desired pixel clock frequency control information based on a difference between expected presentation time, which is based on at least the received image presentation time information from the external source, and actual presentation time information;
   an independent clock source that is independent from the first clock;
   a programmable digital waveform generation circuit that is programmed based on the produced desired pixel clock frequency, having an input responsive to the independent clock source and an output operative to provide a digital representation of an independently generated desired pixel clock;
   a digital to analog converter having an input, operatively coupled to receive the digital representation of the independently generated desired pixel clock, and an output operative to provide an analog representation of the digital representation of the independently generated desired pixel clock for the digital display based on the independent clock source; and
   a phase locked loop circuit (PLL) having an input operatively coupled to the output of the DAC, a phase reference input operatively coupled to receive control information and an output that provides an independently generated desired pixel clock with additional phase correction.

6. The digital pixel clock generation circuit of claim 5 farther including an analog filter operatively interposed between the DAC and the PLL to provide a filtered analog input signal for the PLL.

7. The digital pixel clock generation circuit of claim 6 including digital display timing control logic operatively responsive to the analog representation of the digital representation of the independently generated desired pixel clock and operative to produce the actual presentation time information.

8. A digital pixel clock generation circuit operative to receive image data and corresponding image presentation time information based on a first clock from a plurality of external image sources comprising:
   an image presentation timing error determination circuit operative to produce a desired pixel clock frequency control information based on a difference between expected presentation time, which is based on at least the received image presentation time information from the external source, and actual presentation time information;
   a digital display input signal multiplexing circuit operatively coupled to the image presentation timing error determination circuit, and operative to switch among a plurality of different received image data and corresponding image presentation time information as provided by the plurality of different image sources;
   an independent clock source that is independent from the first clock;
   a programmable digital waveform generation circuit that is programmed based on the produced desired pixel clock frequency control information, having an input responsive to the independent clock source and an output operative to provide a digital representation of an independently generated desired pixel clock;
   a digital to analog converter having an input, operatively coupled to receive the digital representation of the independently generated desired pixel clock, and an output operative to provide an analog representation of the digital representation of the independently generated desired pixel clock for the digital display based on the independent clock source;
   a phase locked loop circuit (PLL) having an input operatively coupled to the output of the DAC, a phase reference input operatively coupled to receive control information and an output that provides an independently generated desired pixel clock with additional phase correction; and
   a video scaling circuit operatively responsive to the independently generated desired pixel clock to provide scaled image data for display on the digital display.

9. The digital pixel clock generation circuit of claim 8 further including an analog filter operatively interposed between the DAC and the PLL to provide a filtered analog input signal for the PLL.

10. The digital pixel clock generation circuit of claim 9 including digital display timing control logic operatively responsive to the analog representation of the digital representation of the independently generated desired pixel clock and operative to produce the actual presentation time information.

11. A method for generating a digital pixel clock in response to received image data and corresponding image presentation time information based on a first clock from at least one external image source comprising:
   producing desired pixel clock frequency control information based on a difference between expected presentation time, which is based on at least the received image presentation time information from the external image source, and actual presentation time information;
   programming a digital waveform generation circuit based on the produced desired pixel clock frequency control information to provide a digital representation of an independently generated desired pixel clock that is based on an independent clock source; and
   providing an analog representation of the digital representation of the independently generated desired pixel clock for the digital display.

12. The method of claim 11 including filtering the analog representation of the digital representation of the independently generated desired pixel clock for the digital display.

13. The method of claim 12 including phase adjusting the filtered analog representation of the digital representation of the independently generated desired pixel clock for the digital display to provide an independently generated desired pixel clock with additional phase correction.

* * * * *